United States Patent
Smith et al.

(10) Patent No.: US 7,517,146 B2
(45) Date of Patent: Apr. 14, 2009

(54) COLOR-RETAINING EXCESS-TEMPERATURE EXPOSURE INDICATOR

(75) Inventors: Dawn E. Smith, Martinsville, NJ (US); Thaddeus Prusik, Stroudsburg, PA (US); Omar Abbassi, Palisades Park, NJ (US)

(73) Assignee: Temptime Corporation, Morris Plains, NJ (US)

( * ) Notice: Subject to any disclaimer, the term of this patent is extended or adjusted under 35 U.S.C. 154(b) by 0 days.

(21) Appl. No.: 11/844,739

(22) Filed: Aug. 24, 2007

(65) Prior Publication Data

US 2008/0056329 A1   Mar. 6, 2008

Related U.S. Application Data

(60) Provisional application No. 60/823,957, filed on Aug. 30, 2006.

(51) Int. Cl.
*G01K 1/00* (2006.01)
*G01K 11/00* (2006.01)

(52) U.S. Cl. .............. 374/162; 374/102; 374/106; 374/208; 116/207; 116/219

(58) Field of Classification Search ............... 374/162, 374/159, 102, 106, 208; 116/207, 219
See application file for complete search history.

(56) References Cited

U.S. PATENT DOCUMENTS

| 5,667,303 | A |   | 9/1997 | Arenset et al. |
|---|---|---|---|---|
| 5,709,472 | A | * | 1/1998 | Prusik et al. ............ 374/106 |
| RE36,062 | E |   | 1/1999 | Spulman et al. |
| 5,997,927 | A |   | 12/1999 | Gics |

OTHER PUBLICATIONS

International Search Report and the Written Opinion dated Apr. 30, 2008 for International Application No. PCT/US2007/076844.

* cited by examiner

*Primary Examiner*—Gail Verbitsky
*Assistant Examiner*—Mirellys Jagan
(74) *Attorney, Agent, or Firm*—K&L Gates LLP

(57) ABSTRACT

An excess temperature indicator can provide a visual indication of past exposure of perishable, maturing and other host products to an elevated temperature exceeding a threshold temperature. The indicator can have an upper layer provided with a viewing window and a wick attached to the upper layer. A reservoir of heat-fusible indicator material can be disposed in contact with the wick, to fuse and move along the wick changing the visual appearance of a first portion of the wick viewable through the window, in response to an excess temperature event. Also, the indicator can have a region of fused upper layer material attaching the wick to the upper layer. Optionally, a window seal can extend around the viewing window to prevent migration of the indicator material. The indicator can be employed to monitor vaccines, foods and other products providing an enduring visual signal of exposure to potentially damaging temperature conditions.

31 Claims, 4 Drawing Sheets

COLOR-RETAINING EXCESS-TEMPERATURE EXPOSURE INDICATOR

CROSS-REFERENCE TO A RELATED APPLICATION

This application claims the benefit of Provisional Patent Application No. 60/823,957 filed Aug. 30, 2006.

STATEMENT REGARDING FEDERALLY SPONSORED RESEARCH OR DEVELOPMENT (Not applicable.)

BACKGROUND OF THE INVENTION

The present invention relates to a novel color-retaining excess-temperature exposure indicator. More particularly, but not exclusively, the invention relates to a novel historical temperature indicator capable of providing a permanent visual indication of past exposure of the indicator to an elevated temperature exceeding a threshold temperature. The invention also relates to such a temperature exposure indicator which is particularly, but not exclusively, useful for monitoring the temperature exposure experience of host products that have high temperature limits with time requirements, for example, fish, meat and other products. The invention also relates to processes for manufacturing such indicators. It is recognized that certain perishable products, especially sensitive foodstuffs such as fresh eggs and fish may have their quality or safety compromised by relatively brief exposures to a temperature in excess of a predetermined threshold. For example, fresh meat and poultry should usually not be exposed for significant time periods to temperatures in excess of 4.4° C. (40° F.). Fresh eggs should not be exposed to temperatures in excess of 7.2° C. (45° F.). In some cases, government regulations may mandate that certain thresholds not be exceeded.

There is accordingly a need for simple, low-cost indicators which can be associated with or attached to a perishable host product to indicate the past occurrence of an excess temperature exposure to a temperature above a threshold.

Prusik et al. U.S. Pat. No. 5,709,472 ("Prusik '472" hereinafter) and its divisional, U.S. Pat. No. 6,042,264 describe and claim a time-temperature indicator label for measuring the length of time to which a product has been exposed to a temperature above a pre-determined temperature. The label is a composite of a plurality of layers that can be adhered at its underside to a product container. The label includes a printable surface layer, a longitudinal wicking strip that is adhered underneath the surface layer substantially at the opposite extremities only of the wicking strip and a lower substrate layer forming an envelope with the surface layer. A heat-fusible substance, which melts and flows above a pre-determined temperature, is applied on the surface of the wicking strip contiguous to at least one of the ends of the wicking member. When the heat-fusible substance is exposed to a temperature above the pre-determined temperature, the heat fusible substance flows along the length of the wicking member. The surface layer is provided with a sight window at an intermediate location over the wicking member through which the progress of flow on the wicking member is observed. This progress can signal the exposure of a product that has exceeded a permissible exposure of time above a pre-determined temperature U.S. Pat. No. 3,954,011 (Manske); U.S. Pat. No. 5,120,137 (Ou-Yang) and U.S. Pat. No. 5,368,905 (Ohno) disclose further temperature exposure indicators. The disclosures of these patents are discussed in Prusik '472.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

BRIEF SUMMARY OF THE INVENTION

The time-temperature exposure indicator device described and claimed in Prusik '472 is believed satisfactory for its intended purpose. However, for some applications it would be desirable to have an excess-temperature exposure indicator that provides a visual indication of excess-temperature exposure which continues to provide a clear signal of the exposure for relatively long periods of time after it has occurred, for example for weeks or months afterwards.

For this and other purposes, the invention provides a novel excess-temperature indicator for providing a permanent visual indication of past exposure of the indicator to an elevated temperature exceeding a threshold temperature. The novel indicator comprises an upper layer having a viewable outer surface and a heat-fusible inner surface opposed to the outer surface. The indicator has a viewing window in the upper layer permitting viewing of a portion of the indicator beneath the upper layer. A wick is attached to the inner surface of the upper layer. The wick has a first portion disposed to be viewable through the viewing window and a second portion disposed away from the viewing window. In addition, the indicator comprises an indicator material reservoir of indicator material disposed in wicking contact with the second portion of the wick. The indicator material is heat-fusible in response to exposure of the indicator to the elevated temperature to provide a wickable liquid. The liquid indicator is transported along the wick to the viewable first portion of the wick and changes the visual appearance of the first portion of the wick. In addition, the indicator comprises a base layer covering the wick and a region of fused upper layer material attaching the wick to the upper layer.

The region of fused upper layer material can comprise resolidified upper layer material intermingled with wick material. By employing the region of fused material to attach the wick to the upper layer, use of adhesive to attach the wick and problems that may arise from the use of adhesive, can be avoided. The region of fused upper layer material can comprise resolidified upper layer material intermingled with wick material.

Surprisingly, excess-temperature indicators according to the invention can provide a long-lasting visual indication of a past excess temperature exposure. The visual signal the inventive indicator provides can be resistant to fading. Employing a colored wax or other suitable colored, or contrasting indicator material, the viewing window can signal the occurrence of an exposure event with an enduring strong color, or other distinctive appearance.

If desired, the wick can be attached to the upper layer of the indicator by the fused region without use of an adhesive material additional to the adhesion provided by the fused upper layer material. Thus, the indicator can have no added adhesive between the upper layer and the wick.

Without being bound by any particular theory, it is believed that, in known indicators employing adhesive, migration of dye or other colorant from the wick into adhesive used to secure the wick may eventually cause fading of the color in the viewing window.

In addition, the invention promotes the reliability and predictability of the indicator by providing low risk of adhesive contaminating the indicator material and possibly affecting its melting point.

In some embodiments of the invention, the base layer overlies the entire wick and the entire indicator material reservoir and the excess-temperature indicator comprises a perimeter seal to seal the upper layer to the base layer along a continuous periphery extending around the wick and the reservoir.

One embodiment of the invention comprises a window seal between the upper layer and the wick, the window seal extending around the viewing window to prevent migration of the indicator material from the viewable first portion of the wick into the upper layer. The window seal can comprise an area fused upper layer material extending across the viewing window.

The invention also provides a process for manufacturing an excess-temperature indicator such as the herein described indicator. In this process, an upper layer with a viewing window viewing a first portion of the wick is provided. The process can comprise heat sealing wick material to the upper layer to provide a region of fused upper layer material attaching the wick material to the upper layer. The indicator material reservoir is disposed in contact with a second portion of the wick. The process further comprises forming the wick from wick material and covering the wick with a base layer.

Some embodiments of the inventive process comprise heating the upper layer to make the heat-sensitive inner surface of the upper layer tacky and applying pressure to seal the wick material to the tacky inner surface of the upper layer. the process can comprise conducting the heat-sealing operation employing moderate conditions of temperature and pressure.

The process can include selecting for the upper layer material a clear flexible synthetic polymeric structural material having a printable outer surface and a heat-sensitive inner surface.

In some embodiments, the inventive process can provide a simpler product having one less component, adhesive to hold the wick, while also being a simpler process because it does not require a step of applying adhesive to attach the wick to the upper layer material.

One embodiment of the inventive process comprises heat sealing the upper layer stock material to the stock wick material to form window seals, each window seal surrounding one of the viewing windows in the upper layer material. The window seals can be formed under more aggressive conditions to provide stronger bonds than the bonds provided by the regions of fused material between the upper layer material and the stock wick material.

The invention also provides a host product and the inventive excess-temperature indicator the excess-temperature indicator being associated with the host product to provide a visual indication of past exposure of the indicator and the host product to an elevated temperature exceeding a threshold temperature.

BRIEF DESCRIPTION OF THE SEVERAL VIEWS OF THE DRAWING

Some embodiments of the invention, and of making and using the invention, as well as the best mode contemplated of carrying out the invention, are described in detail herein, by way of example, with reference to the accompanying drawings, in which like reference characters designate like elements throughout the several views, and in which.

DETAILED DESCRIPTION OF THE INVENTION

Figure 1:
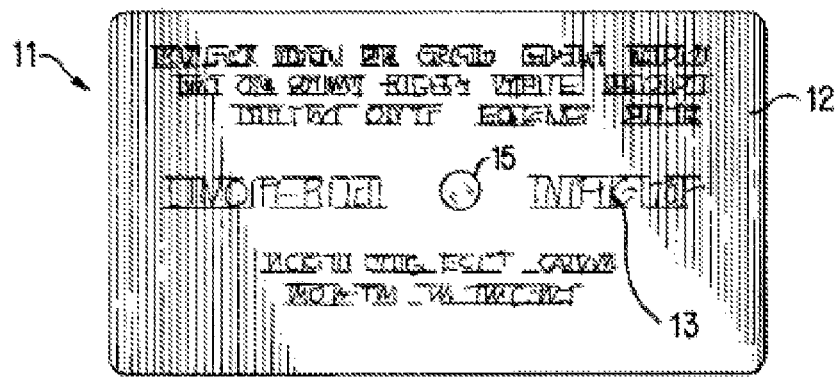
FIG. 1 is a plan view of an embodiment of a prior art time-temperature indicator device according to the disclosure of Prusik '472.

The disclosure of Prusik '472 at column 6, line 25 to column 12, line 9 is herein incorporated by reference. According to the description appearing in Prusik '472, the embodiment of prior art time-temperature indicator device disclosed in FIGS. 1-3 comprises a label 11 having a surface layer 12 which can be opaque and which may be a film, on which is applied contrasting imprinted information 13. Surface layer 12 is provided with a viewing port or window 15 at an intermediate location along the length of a wick member 17. A heat-fusible material 18 is applied on wick member 17. Surface layer 12 can be a clear, flexible, imprintable plastic material which may be made from polyethylene, polypropylene or other plastics. As described, surface layer 12 can be untreated, or treated on one or both surfaces to increase printability. Surface layer 12 can be formed of material suitable for heat-sealing to bottom layer 20.

As described, wick member 17 can be elongated and affixed to the underside of surface layer 12 by adhesive contact areas 19 located at the extremities of wick member 17. Adhesive contact areas 19 appear to serve to hold the die-cut wicks in place while the wick material waste matrix was stripped during manufacture.

Wick member 17 can allow permeation of heat-fusible material 18 along wick member 17, in an amount of time determined by the ambient exposure conditions, and can be comprised of filter paper or other materials.

Furthermore according to the patent description, bottom layer 20 can serve as a base sheet and can be comprised of the same plastic materials as top layer 12 or of different materials. Layer 20 can be opaque to provide to conceal the inner components of the indicator device. Layer 20 is sealed to the top layer 12 in a suitable pattern that surrounds wicking member 17 and heat-fusible material 18 and forms a pouch sealing the operational elements of the indicator device.

Figure 2:
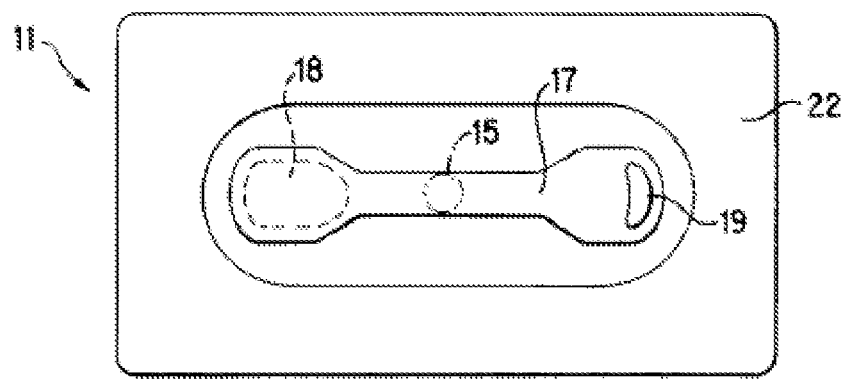
FIG. 2 is a plan view of the indicating device shown in FIG. 1 with a surface film or layer removed.
Figure 3:
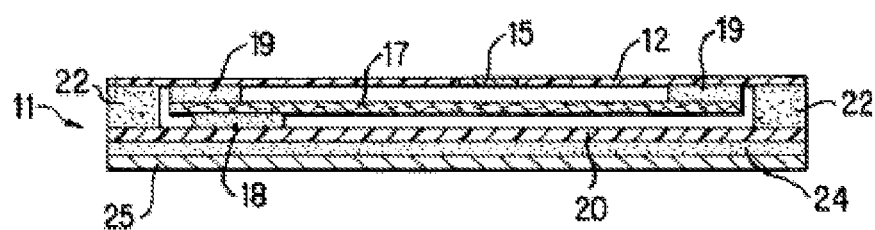
FIG. 3 is an enlarged cross-sectional view of the time-temperature indicator device shown in FIG. 1.

The outer surface of upper layer 20 is described in Prusik '472 as being coated with a self-adhesive layer 24 to allow attachment to a product container (not shown). An outermost layer 25 comprising a release liner can be placed over adhesive layer 24 which can be removed prior to attachment of the indicator device to a host product article. FIG. 1 is illustrative of a finished device with an opaquely printed surface that contains a legend for the proper interpretation of the device. Window 15, also shown in broken line in FIG. 2, is an area that is not printed or is otherwise left transparent, according to the description in the patent, to provide a viewing port to judge the progression of the mobile heat-fusible material 18 along the wick 17 for time above a pre-determined temperature.

Employing a wax heat-fusible material 18 and a white wick member 17, such an indicator may perform in a manner which will now be described. At temperatures below the wax melting point, the dye/wax mixture is solid and does not travel along wick member 17. Transparent window 15 shows only the white wicking material beneath. At temperatures above the wax melting point, the wax and dye travel along the wick, the dyed wax becoming visible in the window after a specified time interval. As stated above, the indicators described and claimed in Prusik '472 are believed suitable for their intended purposes.

In some known excess temperature indicators, although the dye may give a strong color change when it first reaches the viewing window, over prolonged time periods the dye color may fade. Pursuant to the invention it has been understood that this may be due to the dye migrating to other elements of the indicator. For example, while dye may initially spread throughout the entire wick over a longer time period the dye can migrate into the adhesive present at the ends of the wick. The dye can also migrate into the heat-sensitive coating of the upper layer film, where the film is in close physical proximity to the wick, if it has a heat-sensitive coating. With such known devices, over time as the dye continues to migrate into both the adhesive and upper layer film, the dye color in the window region may become less pronounced. After extended periods of time, for example three or more months, the window region can lose so much color as to appear almost white. Endurability or permanence of end point is desirable for such indicator products. Fading of the end point color could lead to confusion and possibly to a consumer or other user deciding to use a product that has in fact been damaged by heat exposure.

Figure 4:
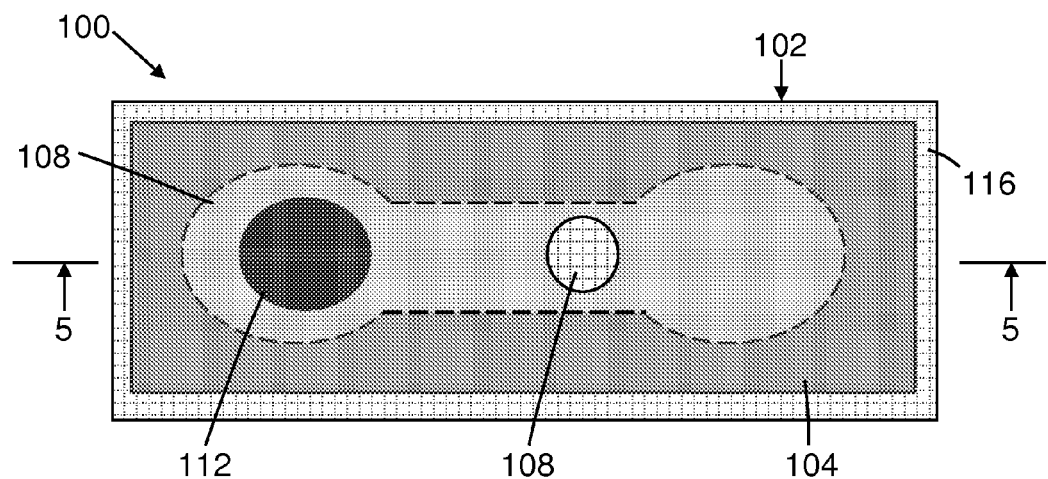
FIG. 4 is a plan view of an embodiment of an excess temperature exposure indicator device according to the present invention.
Figure 5:
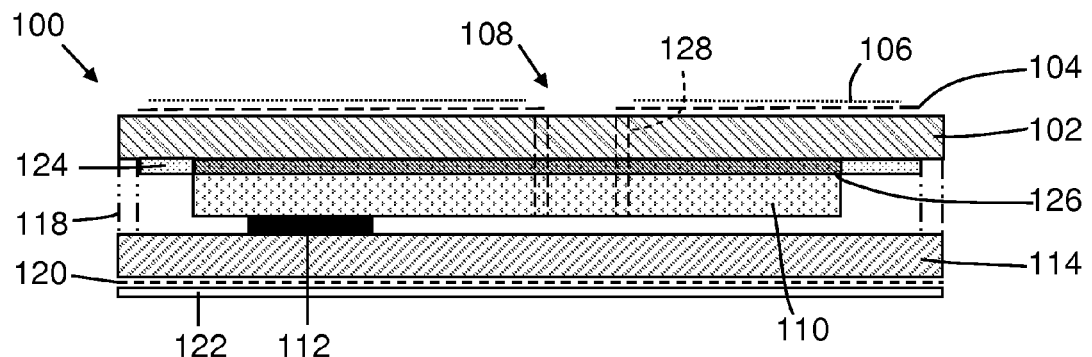
FIG. 5 is a schematic cross-sectional view on the line 5-5 of FIG. 4 wherein the vertical scale, on the paper, has been expanded to facilitate an understanding of the structure shown.

The embodiment of excess temperature exposure indicator device according to the present invention, which is illustrated in FIGS. 4-5 comprises an elongated rectangular indicator label 100, having a length and a width, and having a self-adhesive backing enabling the indicator to be affixed to host product or its packaging to monitor possible exposure of the host product to a temperature above a threshold.

Indicator label 100 has a transparent upper layer 102 on the outer surface of which an optional opaque coating 104 can be provided, for example by printing. Informational indicia 106 can be printed on coating 104, in a contrasting color, shade or intensity, coating 104 serving as a background.

"Color" is used herein to include achromatic visual appearances such as black, grey and possibly also, if the context permits, white, as well as the usual primary, secondary and other color hues, such as, without limitation, red, yellow, green, blue, purple, orange, brown and any other hue.

Opaque coating 104 is omitted from a central area of upper layer 102 to define a viewing window 108 enabling an observer to see through upper layer 102. Viewing window 108 can have any desired shape or configuration and can be located in any desired position on upper layer 102. In the illustrated embodiment, for convenience, viewing window 108 is circular and is located at a midpoint of the length of label 100, centrally of its width. Viewing window 108 can be quite small, for example having a diameter less than one-third the width of label 100.

An elongated, light-colored or white, dogbone-shaped wick 110 contacts upper layer 102 along at least a portion of the length thereof. One end of dogbone-shaped wick 110 extends across, or into, viewing window 108. Desirably, wick 110 covers the whole of window 108 so that a viewer sees a circle, or other shape, of wick 110 against the background of opaque coating 104, if employed. Wick 110 can be formed of a suitable porous material, for example filter paper, which can permit or promote transport of a liquid through along the wick.

A reservoir 112 of solid, heat-fusible indicator material is disposed on wick 110, in wicking contact with the other end of dogbone-shaped wick 110. When indicator 100 is exposed to a temperature above the threshold of the melting point of the heat-fusible indicator material in reservoir 112, the indicator material will begin to melt. If the exposure is of sufficient duration, liquefied indicator material travels along wick 110 to viewing window 108 where its presence indicates the above-threshold temperature exposure event.

As is also described in Prusik '472, the solid indicator material can include a dye or other colorant to improve the viewability of the melted material in viewing window 108. Desirably, the colored melted reservoir material has an appearance that contrasts with opaque coating 104.

In an alternative embodiment of the invention (not shown), employing a transparent upper layer 102, no opaque coating 104 is employed and a viewer can see wick 108 beneath transparent upper layer 102. In this alternative embodiment markings can be provided, if desired, on upper layer 102, to show the progress of indicator material along wick 110.

A base layer 114 of similar size and shape to upper layer 102 covers wick 102. Base layer 114 can be heat-sealed to upper layer 102 to provide a perimeter seal 116, the two layers being formed of materials suitable for the purpose. Desirably, perimeter seal 116 comprises a closed loop surrounding wick 110 and reservoir 112 without contact with either so that upper layer 102 and base layer 114 form a sealed pouch. Broken lines 118 in FIG. 5 indicate that, in practice, the peripheries of upper layer 102 and base layer 114 can be in close proximity, permitting heat-sealing. The showing in FIG. 5 is a schematic rendering intended to facilitate comprehension of the structure of the several layers and other components of indicator 100.

Base layer 114 can be transparent to permit transmission of ultraviolet light during processing, if desired, or can be opaque or given an opaque coating, film or covering layer, if desired. For self-adhesive applications, base layer 114 is provided with a coating of a suitable adhesive 120, which can be covered with a release liner 122. Release liner 122 is removed when it is desired to attach indicator 100 to a host product or other suitable structure. In some embodiments of the invention providing bulk stocks of indicators 100, a common release liner 122 can serve an array of multiple indicators 100.

The above-described structural components, upper layer 102, together with opaque coating 104 and informational indicia 106, if employed, viewing window 108, wick 110, reservoir 112 and base layer 114, together with adhesive 120 and release layer 122, if employed, can, if desired, have any of the various structures described, or be formed of the materials described for corresponding components of the time-temperature indicator label 11 described in Prusik '472 provided that any particular structure or material is compatible with the objectives of the present invention as may be apparent from this description. Such corresponding components can be seen to be surface layer 12 (upper layer 102), window 15 (viewing window 108), wick member 17 (wick 110), heat-fusible material 18 (reservoir 108) and bottom layer 20 (base layer 114) respectively, the corresponding structures shown in FIGS. 4-5 being indicated in parenthesis.

As compared with Prusik '472, or other known art, the present invention provides novel structures and means for guiding and containing melted indicator material and for securing wick 110 in place in indicator 100.

Pursuant to the present invention it has now been understood that although time-temperature indicators according to Prusik '472 are satisfactory for their intended purposes, there are some performance requirements for which an improved or modified excess-temperature indicator would be desirable. Thus, in indicators constructed according to Prusik '472, the heat-fusible dyed wax composition 18 can provide a strong color change upon arrival at window 15. This color change may endure for periods of time that are adequate for many purposes but, over prolonged time periods, for example three months or more, the dyed wax color may fade, in some instances. For more perishable host products having limited shelf lives, for example, fresh foodstuffs, such long term fading may not be relevant. However, for some other products having longer shelf lives, for example vacuum-packed cooked foodstuffs, longer color retention would be desirable.

According to insights of the present invention, it appears that in such known indicators, initially, the dyed wax may spread throughout the entire wick member 17 but not beyond wick member 17, displaying a strong color in window 15. However over a longer time period the color may migrate and be absorbed into adhesive areas 19 which are present at both ends of wick member 17 and are in contact with wick member 17. Also, where the material employed for surface layer 12 is a plastic material having a heat-sensitive coating for heat-sealing to bottom layer 20, pursuant to the present invention, it appears that the color may migrate into the heat-sensitive coating of surface layer 12 where surface layer 12 is in close physical proximity to the wick. Apparently, the heat-sensitive coating may show an affinity for some dyes. Over time if the dye continues to migrate into both adhesive 19 and surface layer 12, the dye color in window 15 can become less pronounced.

Eventually, after extended periods of many months, for example six or more months, the window region may lose so much color as to appear almost white. Permanence of the end point indicated by a color change in the viewing window may be a desirable characteristic for some applications. Fading of the end-point color could lead to confusion, and possible inadvertent use of a product damaged by heat exposure.

To overcome this and other problems, the present invention can provides an excess-temperature exposure indicator which avoids use of adhesive applied to the wick. The invention provides indicators which lack Prusik '472's adhesive contact areas 19 at either end of wick member 17. In some embodiments of indicator according to the invention, no adhesive at all is in contact with the wick.

Referring again to the embodiment illustrated in FIGS. 4-5, a material with a heat-sensitive surface 124, for example a lidding film, is employed for upper layer 102. Heat-sensitive surface 124 is downward facing, as viewed in FIG. 5, facing away from a viewer of indicator 100, and abuts wick 110. It has surprisingly been found, pursuant to the present invention, a region 126 of fused upper layer material can be employed to attach wick 110 to upper layer 102. Region 126 is located at the interface between wick 110 and upper layer 102 and is derived from heat-sensitive surface 124 of upper layer 102. In some embodiments of the invention employing an elongated wick 110, the fused region 126 can be located intermediate the ends of the wick and may extend elsewhere in wick 110 including to the ends of wick 110 and throughout wick 110.

As is described in more detail below, region 126 can be the residue of the application of controlled heat and pressure to upper layer 102 while in contact with wick 110 in a heat-sealing operation. Surface 124 undergoes some melting or fusion when heated, for example to become tacky, and then resolidifies when it is cooled. Thus, region 126 comprises resolidified fused surface material from upper layer 102 which has impregnated the porous structure of wick and solidified in the interstices in the wick material matrix, providing a relatively strong mechanical bond to wick 110. The probable extent of region 126 shown in FIG. 5 has been exaggerated for clarity. Some embodiments of the invention employ a bond wherein the fusion is relatively limited and the upper layer material penetrates only a short distance, for example a few microns, into wick 110 and which is nevertheless sufficient to hold wick 110 in place.

In another embodiment of the invention, wick 110 is also formed of a fusible material that can soften, congeal or partially melt at the heat-sealing temperature, for example a fibrous synthetic polymer. In this case, region 126 comprises a relatively stronger bond between wick 110 and upper layer 102 in which 110 participates with limited transformation of its microstructure.

Surprisingly, in such indicators which employ a region 126 of fused upper layer material to bond wick 110 to upper layer 102, an enduring end-point, with good retention of color in viewing window 108 can be obtained. By avoiding use of adhesive in contact with wick 110 which may, over time act as a sink for the dye, and relying instead upon fused region 126 to secure wick 110 to upper layer 102, the end-point color can be retained for longer.

In some cases, where still longer durations of color retention in window 108 will be useful, it may be desirable to control migration of dye from wick 110 into upper layer 102. Migration of the dye out of wick 110, if sustained over long periods of time for example six or more months, can cause undesired fading of the color in window 108, notwithstanding that the indicator may have been maintained at temperatures beneath the melting point of the indicator material during that period.

To ameliorate or overcome this problem the invention also provides embodiments comprising a window seal 128 extending across and around window 108 to control migration of dye from window 108. Window seal 128 can also comprise fused material from upper layer 102 penetrating into wick 110. In one embodiment of the invention the extent of fusion is substantial and may include fusion of wick material 110, if desired. The mechanical bond between wick 110 and upper layer 102 provided by window seal 128 can be relatively strong, for example stronger than that provided by fused region 126. In one acceptable embodiment of the invention window seal 128 is externally visible as a disc or other appropriate area or mark in upper layer 102.

Embodiments of indicator 100 having a window seal 128 can provide a clearly visible change in color, for example from white to red when a threshold exposure temperature has been exceeded, the color change resulting from migration of colored indicator from reservoir 112 into the viewing field of window 108. Also, the rate of dye migration can be satisfactory and in some embodiments may be virtually unaffected by the presence of window seal 128. In some cases, the color at window 108 may increase in intensity over time, without affecting the flow rate along wick 110.

Thus, the invention is able to provide a useful fade-resistant excess temperature indicator. Surprisingly, additional benefits may flow from fusion bonding the wick to its support layer. For example, the reliability and predictability of the indicator may be enhanced or promoted by as a result of reducing or eliminating possible risk of adhesive contaminating the indicator material. Such contamination by adhesive could affect the melting point of the indicator material. Also, were adhesive to be employed, variation in the deposit rate from on indicator to another, during production can adversely affect the speed of indicator migration to the viewing window by impacting the amount of fusible material released from the indicator reservoir in response to an exposure event. This potential problem can also be mitigated by indicators according to the invention.

It will be understood that the speed of response of indicator 100 can be varied by varying a number of parameters including wick geometry, reservoir geometry materials employed and so on. In particular, indicator 100 can require a predetermined minimum exposure time at an excess temperature by suitable selection of these parameters, as is known in the art. This feature, can be useful to avoid unintentional triggering of the indicator, for example by brief contact with a warm human hand.

Host products with which the inventive indicators may be employed include pre-made meals, fruit, pre-made sandwiches, wine, chocolate, cosmetics (lipsticks, creams, etc), suppositories, blood and blood products, plasma, sea food, vaccines, pharmaceuticals, photographic film, soft drinks, ice cream, vaccines, chemicals, plasma, meat, poultry, food service operations, and other perishable products having high temperature limits with time requirements. The indicators may be adhered to the packaging or otherwise associated with a host product to monitor its temperature exposure.

Manufacturing Processes

Figure 6:
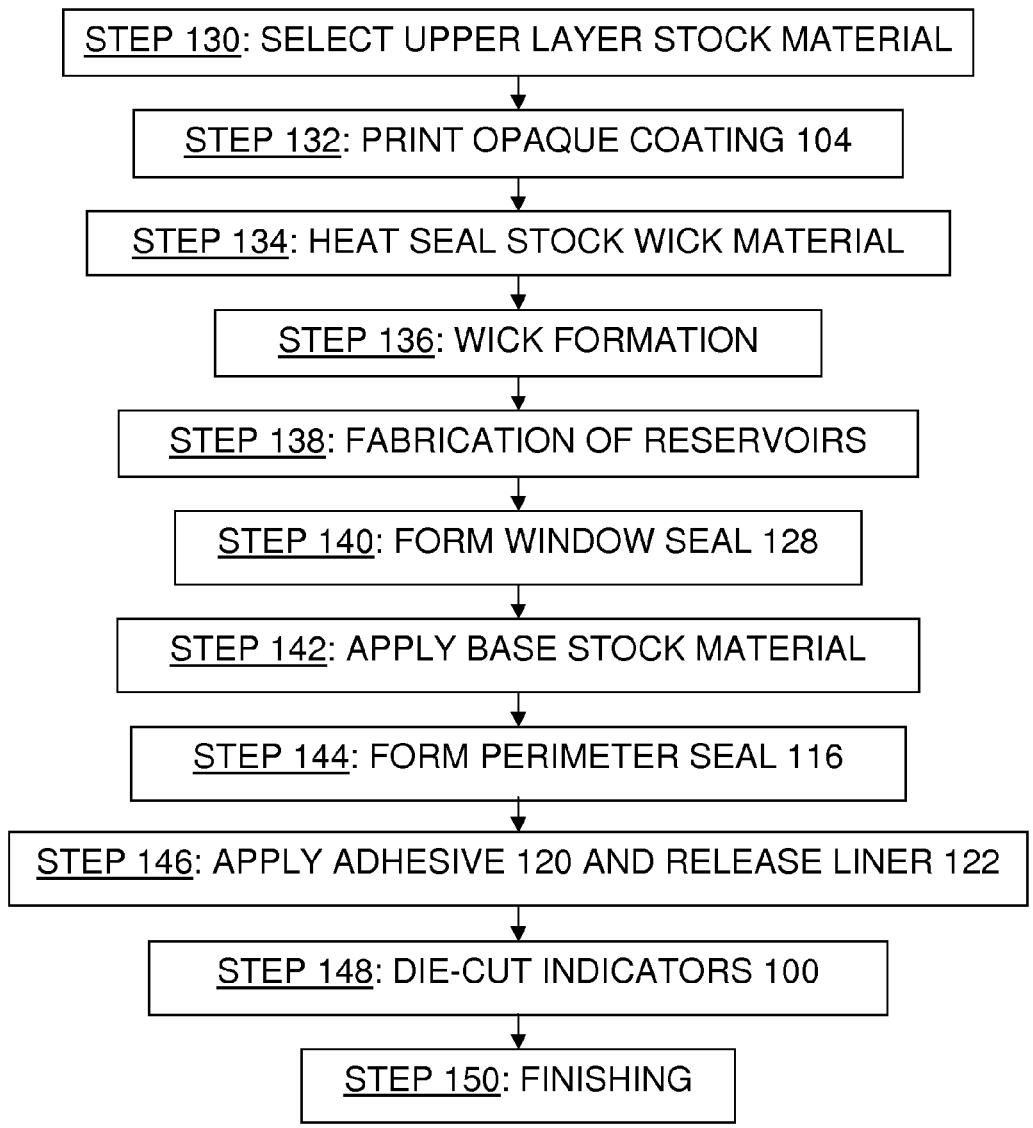
FIG. 6 is a block flow diagram of one embodiment of process for manufacturing an excess temperature exposure device such as is shown in FIGS. 4 and 5.

Excess temperature exposure indicator 100 is suitable for manufacturing by a variety of processes according to the invention, one of which is illustrated in FIG. 6. The illustrated process is suitable for implementation with continuous web stock on a suitably equipped printing press or other rotary machine or machines. However the process can also be implemented with cut sheet stock using sheet feed machinery, or in other suitable ways as will be apparent to those skilled in the art. Some embodiments of the process can be utilized for continuous or semi-continuous mass production, in ways that will be apparent, or become apparent, to those skilled in the art. Possible processes of batch or individual production of indicators 100 will also be or become apparent in light of the disclosure herein.

Referring to FIG. 6, the process embodiment illustrated commences, in step 130, by selecting a suitable stock material from which to fabricate upper layer 102 of indicator 100. In one embodiment of the invention, the selected upper layer material is a clear and flexible synthetic polymeric structural film or web having a printable outer surface and an inner surface treated or coated to be heat sensitive and capable of bonding to a wick material upon application of heat and pressure. The selected upper layer stock material can be a lidding film or other suitable material. Some examples of suitable materials are described in more detail below.

The illustrated indicator manufacturing process continues, in step 132, by printing opaque coating 104 on the outer surface of the upper layer stock material selected in step 130. Desirably, the pattern of opaque coating 104 is chosen so as to define viewing window 108. If desired, informational indicia 106 can be printed on opaque coating 104 at this time in the same, or in a separate, printing operation.

The next step in this embodiment of novel indicator manufacturing process according to the invention, step 134, comprises heat-sealing stock wick material to the printed upper layer stock to provide regions of fused upper layer material that will attach the stock wick material to the upper layer stock material for subsequent processing. In one embodiment of the invention, the heat-sealing operation is conducted to provide a moderate, yet nevertheless effective seal, employing moderate conditions of temperature and pressure that are less stringent than can be used to obtain a full-strength heat seal between the respective materials. The next step of the process, step 136, comprises forming multiple wicks 110 from the stock wick material attached to the upper layer stock material. In one embodiment of the inventive process, this can be effected by cutting outlines of wicks 110 in the stock wick material sealed to the upper layer stock material, according to the wick patterns, and removing the wick material waste matrix, leaving behind the wicks, still attached to the upper layer material.

After forming the wicks in step 136, reservoirs 112 can be fabricated, step 138, by disposing aliquots of indicator material in contact with the other ends of wicks 110 remote from the window ends. For example, metered aliquots of the indicator material can be dispensed on to the wicks in the liquid state. This can be achieved by depositing hot molten indicator material, being indicator material above its melting point, or by dissolving the indicator material in a solvent and depositing the solution. The deposited indicator material aliquots are cooled or dried to form reservoirs 112. Alternatively, solid beads of waxy or plastic reservoir material can be pressed into place on the porous wicks. Other means of fabricating reservoirs 112 will be apparent to those skilled in the art.

After the completion of the fabrication of reservoirs 112 in step 138, an optional further heat-sealing operation, step 140 can be carried out, to form window seals 128. One embodiment of this optional window seal forming step 140 employs a relatively higher temperature than is used in wick heat-sealing step 134 to form a stronger bond. In window seal forming step 140, mild visible deformation of the outer surface of the upper layer stock material may occur, which may be undesirable when heat sealing the wicks. A heatable stamp surface configured to provide a heat seal that will partially or completely surround window 108 can be employed. The stamp surface may, for example, have a circular ring-like, or other shape corresponding with the shape of window 108 and may closely fit, or be somewhat larger than, window 108.

Window seal forming step 140 can be carried out at any time after the wick material has been sealed to the upper layer stock in step 134. Desirably, this heat-sealing operation can be performed after reservoirs 112 have been fabricated to reduce the risk of premature migration of liquid indicator material along wicks 110. In some useful embodiments of the invention, window seal forming step 140 can be performed concurrently with perimeter seal formation, described below.

After reservoir fabrication step 138, a sheet, or continuous web, of base layer stock material is assembled, in step 142, to the indicator components mounted on the upper layer stock material. The base layer stock material is applied to cover and contact wicks 110 and reservoirs 112 and provide material from which base layers 114 can be cut. The base material is brought into contact with the inner surface of the upper layer material, which is exposed between the wicks.

The layered assembly produced in base stock applying step 142 is then passed through a further hot-stamping heat-seal unit in a perimeter-seal forming step, step 144, to create a further heat seal, in this case perimeter seal 116, extending around the perimeter of each of the nascent indicators 100. If desired, as a matter of convenience and efficiency, window seal forming step 140 can also be performed at this time.

The hot stamp conditions in perimeter seal forming step 144, including temperature, are selected according to the particular materials to be heat-sealed, as is known in the art. Any suitable temperature can be employed, for example a temperature in the range of from about 120° C. to about 250° C. Some useful embodiments of the invention employ temperatures in the range of from about 150° C. to about 190° C. In one embodiment, the heat seal temperature is approximately 170° C. The stamping pressure can be adjusted manually to obtain a seal of desired quality, as is known in the art. Promptly after heat-sealing, the sheet or web of indicators 100 is rapidly cooled to prevent melting of the indicator material. In alternative embodiments of the invention, one or more of the additional processing steps described below can be rapidly performed before cooling is effected.

In an alternative embodiment of the invention, wick 110 is attached to base layer 114 by a fusion region between wick 110 and base layer 114. In this case, base layer 114 carries a heat sensitive coating on its upper surface and reservoir 112 is formed on the upper surface of wick 110.

A coating of a suitable pressure-sensitive adhesive is applied to the underside of the base stock material, step 146. A sheet of a suitable release liner stock, for example is then applied to the adhesive coated sheet of indicators to complete step 146.

In a subsequent step, step 148, indicators 100 are die-cut from above, i.e. from the indicator viewing direction, through the upper layer material and the base stock, but not the release liner. The waste matrix is removed, leaving indicators 100 attached to and supported by the release liner stock.

In a finishing step, step 150, slitting, winding, and inspection procedures can be performed, as desired, to yield sheets, rolls or other suitable bulk stocks of indicators 100.

Some more detailed embodiments of the process illustrated in FIG. 6 are described below.

In some embodiments, the printing of opaque coating 104 in step 132, and of information indicia, if printed, can be effected using an ultraviolet-curable ink and curing the ink with a ultraviolet lamp or other ultraviolet source. Alternatively, solvent or water-based ink or inks may be employed.

Wick heat-sealing step 134 of the process can be executed in a variety of ways to fulfill one or more objectives of the invention, as will be apparent to one skilled in the art in light of this disclosure. For example, step 134 can comprise a procedure of only moderate severity, wherein the upper layer stock material is heated until the heat-sensitized inner surface of the upper layer material is tacky. Desirably, the heat-sensitive coating is tacky enough to form a moderate bond to the wick material allowing the residual material matrix to be stripped away in a subsequent step, after wicks have been cut or stamped, without detaching the wicks from the upper layer material.

Pressure can then be applied to seal the stock wick material to the tacky inner surface of the upper layer to generate fusion region 126, as the tacky upper layer material penetrates the wick material and solidifies when cooled. Usefully, sufficiently aggressive heat-sealing conditions are employed to ensure that wicks 110 are securely attached to the upper layer stock material during further processing steps until the indicator base layer material has been sealed to the indicators 100. For example, the wick heat seal can be sufficiently strong that when manually gripped, moderate tension is not effective to peel a wick 110 from the upper layer stock material. Also the wick seal can be sufficiently modest in strength that a strong manual pull on a wick 110 is effective to remove the wick from the upper layer stock material without destroying, tearing or other wise seriously damaging the upper layer stock material.

Desirably, the temperature and pressure are controlled to avoid damaging or deforming upper layer 102. In some embodiments of the invention, it is desirable that the appearance of upper layer 102, in the end-product indicator 100, not be marred by wick heat-sealing step 134. Also in some embodiments, it is desirable for the upper layer stock material to retain sufficient structural strength to provide a self-supporting indicator label. In mass production of indicators 100, for example in a continuous web process, the duration of wick heat-sealing step, and other heat-sealing steps, is determined by the rate of advance of the stock materials. In a batch process the duration of heat-sealing may be a further variable available to the worker to help control the quality and efficacy of heat seal.

If desired, the heating can be localized to areas of the wick material corresponding with patterns of wicks that will be formed in subsequent process steps by removing intermediate areas of the wick material between the heat-sealed areas. For this purpose, stamps each having a heatable surface that will fit within the area of a wick 110 can be employed. Desirably, the stamp heatable surface occupies a significant proportion of the wick area, for example from about 30 to about 90 percent thereof. If desired, the heatable stamp surface can closely correspond with the wick shape and area.

Heat for wick heat-sealing step 134 can be provided by ultraviolet or infrared radiant means, by convective means, or in other suitable manner, for example employing an ultraviolet lamp, an oven, a hot air blower, a heated platen or other suitable apparatus. Where ultraviolet is employed as the heat source the presence of an opaque coating 104 on upper layer 102 can be useful to absorb the radiant energy and provide adequate heating. The tackiness of heat-sensitive surface 124 and the ability to seal it to the stock wick material can be adjusted by adjusting the intensity of the heat source.

In one embodiment of the invention, pressure to complete the wick heat-seal is provided by passing the wick stock material and the upper layer stock material between two rollers, where the nip pressure is sufficient to bond the tacky upper layer material to the wick material.

The herein-described indicator manufacturing processes can in some embodiments of the invention be performed on a Gallus R160 or other suitable printing press. If desired, the printing press can be equipped with an Ikela rotary hot foiling stamp unit, or other suitable stamping unit to effect heat-sealing operations such as wick material heat-sealing step 134, window-forming heat-sealing step 140 and perimeter-sealing step 144.

Materials Employable

Some further materials employable in the practice of the present invention are described below.

Upper layer 102 can comprise any suitable structural material that can provide a viewing window and carry a heat-sensitive coating. One example of a suitable upper layer material comprises a transparent flexible film coated with a heat-sensitive coating. Desirably the coating only becomes tacky after heating. A useful class of such materials comprises lidding films. Lidding films are often considered to comprise a base film that is relatively heat-resistant and has a heat-sensitive coating that is non-tacky at room temperature but which melts when exposed to heat.

Some examples of lidding films which may be employed for upper layer 102 in the practice of the invention include: DUPONT TEIJIN™ films OL12, 100 gauge polyester film with amorphous polyester heat-sensitive coating supplied by DuPont Teijin Films, Hopewell, Va.; CRYOVAC™ R660B polyester lidding film, H6225B polyester lidding film, N7225B nylon lidding film and T7225 nylon lidding film supplied by Sealed Air Corporation, Cryovac Food Packaging Division, Duncan, S.C.; and 2.0 mil low-density polyethylene (LDPE) having a 0.5 mil polyester coating, such as is employed in heat-seal boil-in-bags MP-4.2B from Bag Packaging Corp. of Roselle, N.J.

Some examples of wick materials that may be employed to fabricate wicks 110 include: Ahlstrom 601 and 631 paper (Ahlstrom Corp. at www.ahlstrom.com and Whatman grade 1 Qualitative paper and Chromatography paper 1 Chr, 2 Chr, and 3 Chr (Whatman Inc. of Clifton, N.J. and www.whatman.com.

The heat-fusible indicator material employed in reservoir 112 desirably can be selected or formulated of a material having a melting point at or near the predetermined temperature threshold such that the material melts and can flow at temperatures elevated above the threshold temperature. Desirably, the heat-fusible indicator material will melt at a desired temperature, migrate along wick 110 and provide a visible appearance change at viewing window 108. Some examples of waxes that can be employed for the indicator material with their melting points shown in parenthesis include undecane (−26° C.); dodecane (−12° C.); tridecane (−6° C.); tetradecane (7° C.); pentadecane (10° C.); hexadecane (18° C.); heptadecane (21° C.); octadecane (28° C.); nonadecane (34° C.); eicosane (37° C.); heneicosane (40.5° C.); hexanoic acid (−4° C.); hexadecane (18° C.); and ethyl lactate (26° C.). The foregoing waxes are available from Aldrich Chemical Company.

The indicator material to be employed can be selected according to its melting point and the excess temperature exposure it is desired to indicate. Some embodiments of the invention select the indicator material from relatively pure crystalline chemical substances that provide a distinct melting point. Many of these materials are white or colorless. To provide a colored or light-absorbent, indicator material a suitable dye or pigment which is soluble in or can be dispersed in the wax or other heat-fusible material can be employed. Strong dyes that can be employed in small quantities to have little effect on the melting point of the heat-fusible material can usefully be employed. High color intensity can be desirable to provide a good contrast and clear visual indication. Reds and oranges can be helpful in attracting attention or providing a warning signal.

Some useful dyes that may be employed in the practice of the invention include: Orient Blue 35, Oil Blue 613, and Oil Blue 650 from Orient Corporation of America; KEYPLAST™ Liquid Oil Red HF from Keystone Aniline Corporation; and Oil Red O, methylene blue and Victoria Blue B from Aldrich Chemical Company.

Alternatively to being dissolved or dispersed in the heat-fusible material, the dye or pigment may be separately applied to the wick or to reservoir 112 to be entrained by the migrating heat-fusible material.

Base layer 114 can be formed of any suitable material that can be heat sealed to upper layer 102. An opaque film material can be employed which can be any desired color, including white. Some examples of base stock materials that can be employed include: Classics Plus 28185; THERMLFILM™ PP 260H White TC-387 V-344 Spec 50K-8; OPTIFLEX™ PP-260-HW PTP V-344 Spec 50K-8 and OPTIFLEX EZ PP 245 White 44PP-8; all available from FLEXCON, of Spencer, Mass. In one embodiment of the invention, commercially available label stock is employed to provide not only base layer 114 but also a silicone-coated release liner 122 and pressure-sensitive adhesive 120.

One useful embodiment of the invention employs DuPont Teijin Films OL12 upper layer material, Whatman Chromatography paper 2 Chr wick material, Aldrich Oil Red O dissolved in Aldrich pentadecane wax and FLEXCON Classics Plus 28185 base layer material.

As stated above, other suitable materials for some of the components of the invention are described in Prusik '472. Still others will be known or will become known to those skilled in the art.

The invention includes user-activatable embodiments wherein a user takes positive action to initiate the indicator. For example, employing technology such as is described in Prusik '472, a small amount of microcapsules containing a heat-fusible substance can be applied to the label wicking material at least on one end. Such an indicator can remain inactive for an extended shelf life, without responding to excess temperatures. It can be activated when desired by applying sufficient pressure on the microcapsule-containing portion of the indicator.

EXAMPLES

The following experiments illustrate the practice of the invention in an exemplary non-limiting manner.

Control 1

Figure 7:
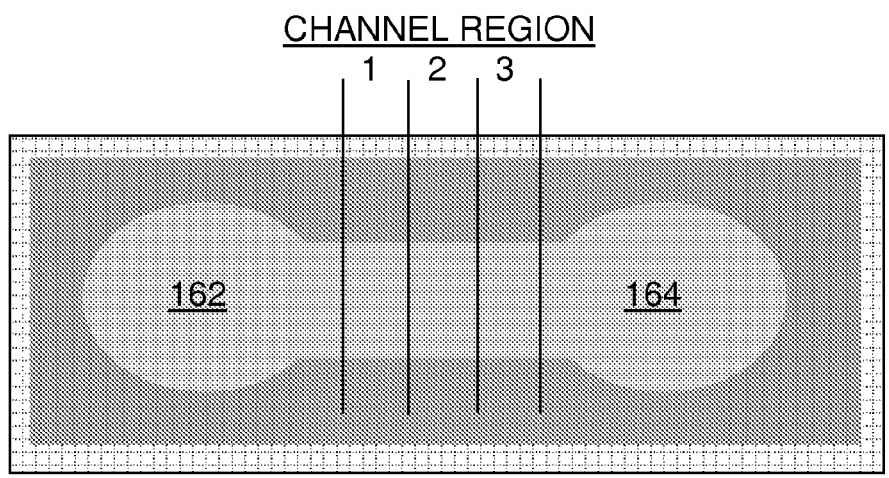
FIG. 7 is a schematic plan view of an embodiment of excess temperature exposure device useful in experiments illustrative of the practice of the invention.

38 mm long wicks of "dogbone" shape wick elements 160, as shown in FIG. 7, are die-cut from white Ahlstrom 601 paper. A 4 microliter drop of KEYPLAST™ 1% Red HF dye dissolved in pentadecane is applied by pipette to each wick reservoir bulb 162. The wicks are placed between two layers of transparent polyester film 166, taped at the edges to prevent evaporation, and progress of dye along the wick 160 is observed over time. Channel regions 1-3 are labeled as shown to mark the progress. Channel region 3 is designated as a window region to be left transparent, corresponding with the window in a commercial product through which a consumer or other end user can observe. The expected color change from white to red will become visible in this region. Indicator end points are estimated as the time at which a significant color change occurs within channel region 3. The permanence of the end point is assessed by the retention of color in channel region 3. Testing is done at room temperature.

The end point is reached after about 90 minutes, when the dye enters region 3. The dye passes through region 3 into the attachment bulb after about 3 hours. After 3 days, dye covers most of the wick, ranging from dark pink at reservoir bulb 162, to pink in the channel to light pink in attachment bulb 164. After 3 months, the wick is pink from reservoir bulb 162 to attachment bulb 164. This indicator design shows an end point transition from white to pink, with retention of the pink color over time.

Control 2

Control 1 is repeated with the difference that the wick is attached on its lower surface to polyester film at reservoir bulb 162 and at the attachment bulb using ultraviolet-cured pressure-sensitive adhesive Rad-Cure X5011431 prior to testing. The end point is reached after about 90 minutes, when the red dye enters region 3. The dye passes through region 3 into attachment bulb 164 after about 3 hours. After 3 days, dye covers most of the wick, ranging from dark pink at reservoir bulb 162, to pink in the channel to light pink in the attachment bulb. After 3 months, the wick is light pink from reservoir bulb 162 to attachment bulb 164, and the adhesive attaching the wick to the polyester film in both reservoir bulb 162 and attachment bulb 164 is dark red. This indicator design has an end point transition from white to pink, with fading of the end point color to light pink over time. Control Experiment 2 illustrates what happens when adhesive is used to attach the wick to the film.

Example 1

Control 1 is repeated except that 3M Scotch™ Magic Tape 810 adhesive tape is applied over the channel region 3 prior to testing. The end point is reached after about 90 minutes, when the red dye enters region 3. The dye flow slows after reaching region 3, compared to the control samples. After 3 hours, the dye has not passed through region 3 into the attachment bulb. After 3 days, reservoir bulb and channel regions 1 and 2 are light pink and the channel region 3 is dark red, while attachment bulb 164 remains white. This indicator displays an end-point transition from white to red, with the end-point color intensifying over time to a permanent dark red as a result of continued dye migration into the adhesive. This indicator design also shows a reduction in dye flow rate as a result of the adhesive tape. Embodiments of such an indicator can be useful for relatively longer term indicators rated for example for one day, one week or longer.

Example 2

Control 1 is repeated except that the wick is heat-sealed between two polyester lidding films on both sides prior to testing, with the heat seal creating a 4 mm wide bond between the wick and film in channel region 3 on both the upper and lower surfaces of the wick. The end point is reached after about 90 minutes, when the red dye enters region 3. The dye passes through region 3 within about 3 hours. The heat seal does not appear to significantly affect the time taken to reach the end point or the color intensity at the end point. After 3 days reservoir bulb 162, channel regions 1 and 2, and the attachment region are light pink, while channel region 3 is red. After 3 months, the wick is light pink from reservoir bulb 162 to attachment bulb 164, except for the channel region 3, which is a dark red color. This indicator design shows an end-point transition from white to pink to red, with the red color intensifying over time to a permanent dark red end point as a result of continued dye migration into the heat seal coating over time. This indicator design does not show a reduction in dye flow rate as a result of the heat seal.

Example 3

Heat-seal bags MP-4.2B from Bag Packaging Corp. are cut open to obtain lidding film. Other lidding films are used as supplied. Lidding films are sealed to wick material (Ahlstrom 631 or 601 paper) using a Clamco heat sealer set at 300° F. with a 3-second contact time, except Ahlstrom 601 with OL12, which is sealed at 325° C. for 4 seconds. This results in a paper-film laminate with a 3/16-inch heat seal bond. Rectangular strips of 1/4 inch width are cut perpendicularly to the heat seal bond. Strips are trimmed such that the heat seal is 3/4 inch from each end, giving a 3/4 inch "travel length", i.e. the length of wick to be covered prior to reaching the heat seal laminate. Control samples are prepared in the same way, without heat-sealing or lamination in the target region. Saturated dye solutions are made by adding blue dye powders in excess amounts to the liquid waxes, and then filtering to remove undissolved dye. Dye solutions of volume 5 microliters are applied by pipette to one side of the strip, 1/8 inch from the end. Strips are then taped between transparent polyester sheets to prevent evaporation. Over the next few hours, the dye solutions travel along the paper wicks towards the heat sealed region, and then beyond it. All testing is done at room temperature.

Optical density (OD) is measured with an X-Rite densitometer in cyan mode. OD measurements are taken directly above the heat sealed region, with white paper behind the sample. A starting OD is obtained before dye is added. Samples 5 and 7 employ Ahlstrom 631 paper and Bag Packaging boil-in-bag lidding film. Control samples 6 and 8 employ Ahlstrom 631 paper alone. Results for Samples 5-8 are shown in Table 3, below.

TABLE 3

| | Dye Solution | OD (cyan) | | | | | |
|---|---|---|---|---|---|---|---|
| | | Start | 30 min | 1 hr | 4 hr | 24 hr | 48 hr |
| 5 | Orient Blue 35 in hexanoic acid: heat sealed | 0.25 | 1.01 | 1.17 | 1.19 | 1.19 | 1.16 |
| 6 | Orient Blue 35 in hexanoic acid: control | 0.17 | 0.98 | 1.07 | 1.01 | 0.99 | 0.91 |
| 7 | Orient Blue 35 in hexadecane: heat sealed | 0.24 | 0.29 | 0.69 | 0.84 | 0.92 | 0.92 |
| 8 | Orient Blue 35 in hexadecane: control | 0.16 | 0.16 | 0.62 | 0.69 | 0.64 | 0.61 |

It can be seen that Samples 5 and 7, employing lidding film, show significantly greater color intensity, as indicated by higher OD readings than the corresponding control Samples 6 and 8, respectively. The effect is apparent after only 1 hour and more pronounced at 24 and 48 hours.

Samples 9-19 employ various wick materials and lidding films which are identified in the column labeled "Construction Materials". Control samples 20-23 lack lidding film. All samples use Orient Blue 35 dye in hexadecane. Some exemplary results obtainable for samples 9-23 are shown in Table 4, below.

TABLE 4

| | Construction Materials | OD (cyan) | | | | | |
|---|---|---|---|---|---|---|---|
| | | Start | 30 min | 1 hr | 4 hr | 24 hr | 48 hr |
| 9 | Ahlstrom 631/OL12 | 0.20 | 0.24 | 0.64 | 0.73 | 0.76 | .78 |
| 10 | Ahlstrom 601/OL12 | 0.19 | 0.22 | 0.45 | 0.67 | 0.82 | .86 |
| 11 | Whatman grade 1 Qual./OL12 | 0.21 | 0.24 | 0.30 | 0.73 | 0.80 | .84 |
| 12 | Whatman grade 1 Chr./OL12 | 0.21 | 0.32 | 0.69 | 0.78 | 0.83 | .85 |
| 13 | Ahlstrom 631/T7225B | 0.23 | 0.26 | 0.67 | 0.84 | 0.82 | .82 |
| 14 | Ahlstrom 631/H6225B | 0.23 | 0.27 | 0.74 | 0.85 | 0.84 | .83 |

TABLE 4-continued

| Construction Materials | OD (cyan) | | | | | |
|---|---|---|---|---|---|---|
| | Start | 30 min | 1 hr | 4 hr | 24 hr | 48 hr |
| 15 Ahlstrom 631/R660B | 0.23 | 0.27 | 0.64 | 0.80 | 0.90 | .94 |
| 16 Ahlstrom 631/N7225B | 0.20 | 0.25 | 0.61 | 0.74 | 0.81 | .81 |
| 17 Ahlstrom 601/R660B | 0.22 | 0.27 | 0.45 | 0.79 | 0.92 | .96 |
| 18 Whatman grade 1 Qual./T7225B | 0.21 | 0.27 | 0.63 | 0.87 | 0.87 | .87 |
| 19 Whatman grade 1 Chr./H6225B | 0.21 | 0.27 | 0.67 | 0.81 | 0.84 | .84 |
| 20 Ahlstrom 631 control | 0.14 | 0.17 | 0.43 | 0.63 | 0.60 | .59 |
| 21 Ahlstrom 601 control | 0.14 | 0.14 | 0.17 | 0.55 | 0.60 | .60 |
| 22 Whatman grade 1 Qual. control | 0.13 | 0.18 | 0.35 | 0.64 | 0.65 | .63 |
| 23 Whatman grade 1 Chr. control | 0.13 | 0.21 | 0.60 | 0.71 | 0.65 | .63 |

As can be seen from Table 4, the color intensities of control Samples 20-23 tend to plateau at OD values of about 0.6 to 0.7 within the first day, and are essentially the same by the second day. In contrast, samples 9 through 19 typically have higher OD values within the first day, in the range of about 0.7 to about 0.9 with no significant loss of the elevated intensity by the end of the second day. Samples 10, 11, 15, and 17 are notable. OD differences of less than 0.03 are not considered significant given a densitometer sensitivity of about ±0.01 and that the human eye generally cannot detect OD differences smaller than about 0.02.

If desired, the resistance of the excess temperature indicator to color fading can be enhanced by protecting colored indicator material from ambient radiation that may induce fading or other undesired visual effect. Once colored wax or other colored indicator material appears in viewing window 108 of indicator 100, it may be exposed to fade-inducing ambient radiation such as ultraviolet or other actinic radiation.

To help resist this effect, embodiments of the invention can, if desired, include a layer of actinic radiation absorbent material interposed between the indicator material and the possible ambient radiation. The layer of actinic radiation absorbent material can absorb and ameliorate the effects of the actinic radiation before it reaches the indicator material through viewing window 108. The actinic radiation-absorbent material can comprise an ultraviolet-absorbent material, for example zinc oxide, titanium dioxide, an organic compound, or a mixture of two or more such compounds, or any other suitable ultraviolet-absorbent substance or composition, as is known, or will become known, to a person of ordinary skill in the art. The actinic radiation-absorbent material can comprise, or be embodied in an additional layer of ink, film or the like, or can be incorporated in upper layer 102. The actinic radiation-absorbent material can be disposed in any suitable manner that can intercept radiation received through viewing window 108. For example, an actinic-absorbent layer can be printed on either the outer or the inner surface of upper layer 102.

Figure 8:
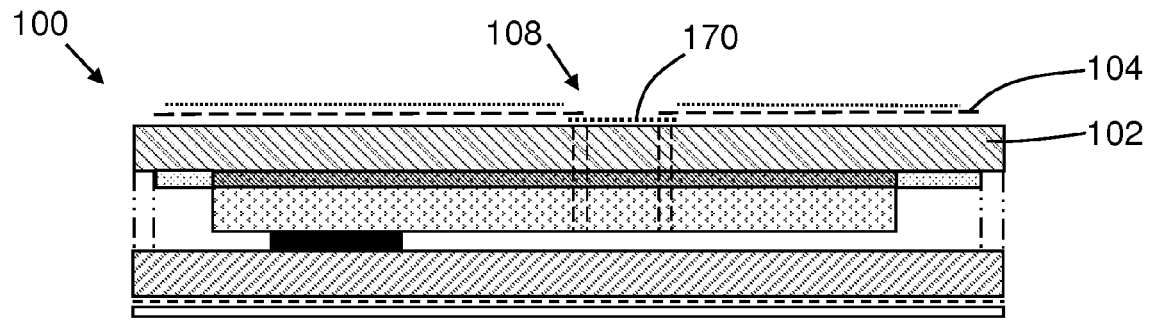
FIG. 8 is a view similar to FIG. 5 showing a modified embodiment of the excess temperature indicator illustrated in FIG. 5.

FIG. 8 shows an actinic-absorbent layer 170 printed on the outer surface of upper layer 102 overlying viewing window 108. Actinic-absorbent layer 170 can have any desired size or shape. Desirably, it can completely cover window 108 and optionally can have a corresponding shape to, and can extend marginally beyond, window 108. For example, if viewing window 108 is circular, actinic-absorbent layer 170 can comprise a disc or having a radius 10-25 percent greater than viewing window 108. Actinic-absorbent layer 170 is visible-light transmissive and can be clear or lightly colored, for example tinted orange or yellow.

Alternatively, actinic-absorbent layer 170 can be a polymeric film rather than being printed. Actinic-absorbent layer 170 can be either a printed layer or a film disposed on the underside of upper layer 102.

Actinic absorbent layer 170 can be fabricated in any desired manner. For example, referring to the exemplary process illustrated in FIG. 6, actinic absorbent layer 170 can be printed on to the upper layer stock material before heat sealing of the wick material in step 184 either before or after opaque coating 104, if employed, is printed on to the upper layer stock material in step 132.

Some suitable actinic-absorbent materials and constructions that can be employed in the practice of the present invention are disclosed in US Patent Application Publication No. 2004/0253733 the disclosure of which is incorporated by reference herein.

Actinic absorbent layer 170 can help prevent fading of the signal given by an exposed indicator 100 in a refrigerated display subject to ultraviolet-emitting fluorescent lighting or to an exposed indicator 100 that is subject to daylight.

Throughout the description, where compositions or structures are described as having, including, or comprising specific components, or where processes are described as having, including, or comprising specific process steps, it is contemplated that compositions or structures of the present invention may also consist essentially of, or consist of, the recited components, and that processes embodying the present invention may also consist essentially of, or may consist of, the recited processing steps. It should be understood that the order of steps, or order for performing certain actions, is immaterial provided that the respective process embodiment is useful for the purposes of the invention. Moreover, two or more steps or actions may be conducted simultaneously, if the context permits.

All proportions recited herein are to be understood to be proportions by weight, based upon the weight of the relevant composition, unless the context indicates otherwise.

The foregoing detailed description is to be read in light of and in combination with the preceding background and invention summary descriptions wherein partial or complete information regarding possible embodiments of the invention may be set forth and where modifications, alternative and useful embodiments of the invention may be suggested or set forth, as will be apparent to one skilled in the art. Should there appear to be conflict between the meaning of a term as used in the written text of this specification and the usage in material incorporated by reference from another document, the usage herein is intended to prevail.

While illustrative embodiments of the invention have been described above, it is, of course, understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

The invention claimed is:

1. An excess temperature indicator for providing a visual indication of past exposure of the indicator to an elevated temperature exceeding a threshold temperature, the indicator comprising:
    (a) an upper layer having a viewable outer surface and a heat-fusible inner surface opposed to the outer surface;
    (b) a viewing window in the upper layer permitting viewing of a portion of the indicator beneath the upper layer;

(c) a wick attached to the inner surface of the upper layer, the wick having a first portion disposed to be viewable through the viewing window and having a second portion disposed away from the viewing window;

(d) an indicator material reservoir disposed in wicking contact with the second portion of the wick, the indicator material being heat-fusible in response to exposure of the indicator to said elevated temperature to provide a wickable liquid indicator, the liquid indicator being transported along the wick to the viewable first portion of the wick and changing the visual appearance of the first portion of the wick;

(e) a base layer covering the wick; and (f) a region of fused upper layer material attaching the wick to the upper layer.

2. An excess-temperature indicator according to claim 1 wherein the upper layer material is selected from the group consisting of a clear, flexible, structural polymer having a heat-sensitive coating, a lidding film, a polyester lidding film, a nylon lidding film, a low-density polyethylene lidding film, a polyester film having an amorphous polyester heat-sensitive coating and a low-density polyethylene film having a polyester coating.

3. An excess temperature indicator according to claim 1 wherein the indicator material comprises a dye or pigment and a heat fusible material selected from the group consisting of a wax, an alkane wax, undecane, dodecane, tridecane, tetradecane, pentadecane, hexadecane, heptadecane, octadecane, nonadecane, eicosane, heneicosane, hexanoic acid, hexadecane and ethyl lactate and has a melting point providing an indicator signal at the elevated temperature.

4. An excess temperature indicator according to claim 1 comprising a layer of actinic radiation absorbent material interposed between the indicator material and ambient radiation receivable by the indicator material through the viewing window, the actinic radiation-absorbent material optionally being a printed layer of an ultraviolet-absorbent ink.

5. An excess-temperature indicator according to claim 1 wherein the wick comprises a paper element to transport liquid indicator from the indicator material reservoir to the viewing window.

6. An excess-temperature indicator according to claim 1 comprising a pressure-sensitive adhesive coating on the underside of the base layer and a release liner covering the adhesive coating.

7. An excess-temperature indicator according to claim 1 having no added adhesive between the upper layer and the wick.

8. An excess-temperature indicator according to claim 7 wherein the base layer overlies the entire wick and the entire indicator material reservoir and the temperature indicator comprises a perimeter seal to seal the upper layer to the base layer along a continuous periphery extending around the wick and the reservoir.

9. An excess-temperature indicator according to claim 1 wherein the region of fused upper layer material comprises resolidified upper layer material intermingled with wick material.

10. An excess-temperature indicator according to claim 9 configured as a label, the excess temperature indicator having no added adhesive between the upper layer and the wick and comprising an opaque coating on the outer surface of the upper layer to conceal internal structure beneath the upper layer from a viewer and optionally comprising printed indicia on the opaque coating wherein:

the upper layer comprises a clear, flexible, structural polymeric sheet material;

the wick comprises a paper element to transport liquid indicator from the indicator material reservoir to the viewing window;

the indicator material comprises a wax selected to have a melting point providing an indicator signal at the elevated temperature wherein the wax comprises a dye or pigment providing the wax with visibility; and the base layer overlies the entire wick and the entire indicator material reservoir and the temperature indicator comprises a perimeter seal to seal the upper layer to the base layer along a continuous periphery extending around the wick and the reservoir.

11. An excess-temperature indicator according to claim 1 comprising a window seal between the upper layer and the wick, the window seal extending around the viewing window to prevent migration of the indicator material from the viewable first portion of the wick into the upper layer.

12. An excess-temperature indicator according to claim 11 wherein the window seal comprises an area of fused upper layer material extending across the viewing window.

13. An excess-temperature indicator according to claim 11 wherein the region of fused upper layer material provides a moderate strength bond between the wick and the upper layer and the window seal provides a high strength bond between the wick and the upper layer.

14. A process for manufacturing an excess-temperature indicator according to claim 1, the process comprising:

(a) providing the upper layer and the viewing window in the upper layer;

(b) heat sealing wick material to the upper layer to provide the region of fused upper layer material attaching the wick material to the upper layer; and (c) disposing the indicator material reservoir in contact with the second portion of the wick;

(d) forming the wick from the wick material; and (e) covering the wick with the base layer.

15. A process according to claim 14 comprising applying a layer of transparent actinic radiation absorbent material to the upper layer to cover the viewing window, optionally by printing a layer of an ultraviolet-absorbent ink on the upper layer.

16. An excess-temperature indicator according to claim 14 comprising an opaque coating on the outer surface of the upper layer to conceal internal structure beneath the upper layer from a viewer and optionally comprising printed indicia on the opaque coating.

17. A process according to claim 14 comprising forming the wick from the wick material by cutting an outline of the wick in the wick material sealed to the upper layer and removing surplus wick material from around the wick wherein the region of fused material holds the wick in place during cutting of the wick outline and removal of surplus wick material.

18. A process according to claim 14 comprising applying the base layer over the entire wick and the entire indicator material reservoir and heat sealing the upper layer to the base layer along a continuous periphery extending around the wick and the reservoir to provide a perimeter seal.

19. A process according to claim 18 comprising heat sealing the upper layer material to the wick material to form a window seal, the window seal surrounding the viewing window in the upper layer material.

20. A process according to claim 19 comprising forming the window seals under more aggressive conditions to provide stronger bonds than the bonds provided by the regions of fused material between the upper layer material and the stock wick material.

21. A process according to claim 18 comprising heating the upper layer to make the heat-sensitive inner surface of the upper layer tacky and applying pressure to seal the wick material to the tacky inner surface of the upper layer.

22. A process according to claim 21 comprising conducting the heat-sealing operation employing moderate conditions of temperature and pressure.

23. A process according to claim 21 comprising selecting for the upper layer material a clear flexible synthetic polymeric structural material having a printable outer surface and a heat-sensitive inner surface.

24. A process according to claim 14 comprising employing upper layer stock material, wick stock material and base layer stock material to form multiple excess-temperature indicators wherein the stock material is in sheet form and the sheets of stock material optionally comprise continuous webs of stock material.

25. A process according to claim 24 wherein heat sealing the wick stock material to the upper layer stock material comprises heating the upper layer stock material to make the heat-sensitive inner surface of the upper layer stock material tacky and applying pressure to seal the wick stock material to the tacky inner surface of the upper layer stock material and forming the wicks from the wick stock material comprises forming outlines of the wicks in the wick stock material while sealed to the upper layer stock material, the wick outlines defining a matrix of waste wick stock material, and removing the matrix of waste wick stock material while leaving the wicks attached to the upper layer material.

26. A process according to claim 25 wherein the upper layer material is selected from the group consisting of a clear, flexible, structural polymer having a heat-sensitive coating, a lidding film, a polyester lidding film, a nylon lidding film, a low-density polyethylene lidding film a polyester film having an amorphous polyester heat-sensitive coating and a low-density polyethylene film having a polyester coating.

27. A process according to claim 26 comprising applying a pressure-sensitive adhesive coating to the lower surface of the base layer stock material, applying a release liner to the adhesive coating and cutting out the indicators without cutting through the release liner to provide multiple indicators supported on the release liner.

28. A process according to claim 25 wherein heat for heating the upper layer stock material is provided by an ultraviolet or infrared radiant source, a convective source, an oven, a hot air blower or a heated platen.

29. A process according to claim 28 comprising fabricating the indicator reservoirs by depositing aliquots of indicator material reservoir in contact with the second portions of the wicks.

30. A process according to claim 29 comprising printing an opaque coating on the outer surface of the upper layer stock material and, optionally, printing informational indicia on the opaque coating.

31. A host product and an excess-temperature indicator according to claim 1, the temperature indicator being associated with the host product to provide a visual indication of past exposure of the indicator and the host product to an elevated temperature exceeding a threshold temperature.

* * * * *